United States Patent
Van Buskirk

[11] 3,842,660
[45] Oct. 22, 1974

[54] TROUGH APPLICATOR

[76] Inventor: Henry Charles Van Buskirk, 1278 Forest St., Denver, Colo. 80222

[22] Filed: Mar. 19, 1973

[21] Appl. No.: 342,596

[52] U.S. Cl............................................. 73/61.1 C
[51] Int. Cl......................... G01n 1/00, G01n 31/08
[58] Field of Search.................. 73/425.4 P, 61.1 C; 23/292; 15/104 R

[56] References Cited
UNITED STATES PATENTS
2,868,020  1/1959  Williams........................ 73/425.4 P
3,505,858  4/1970  Kohn............................... 73/61.1 C Primary Examiner—S. Clement Swisher

[57] ABSTRACT

A device, intended for the correct and precise spotting of serums or other fluid substances used as samples on electrophoresis paper for examination and analyses, is disclosed herein.

The Trough applicator, because of the specialized shape and configuration of the trough edge, allows a maximal blotting action on the electrophoresis paper, combined with uniform absorption, thus effecting clear electrophoretic separations.

5 Claims, 4 Drawing Figures

PATENTED OCT 22 1974 3,842,660

3,842,660

TROUGH APPLICATOR

BACKGROUND OF THE INVENTION

As a useful laboratory implement in bio-chemistry or allied fields, the present device was evolved as the result of successive attempts to produce a means of transferring a serum sample to the electrophoresis paper, while combining a quantitative volume capacity.

OBJECTS OF THE PRESENT INVENTION

The major object of the present invention is to provide a device which is simple to use, accurate in quantitative delivery, and one which is easily manufactured.

A secondary object of the invention is the simplicity, durability, and the convenience of maintaining a degree of sterile cleanliness, where required.

DETAILED DESCRIPTION

Figure 2:
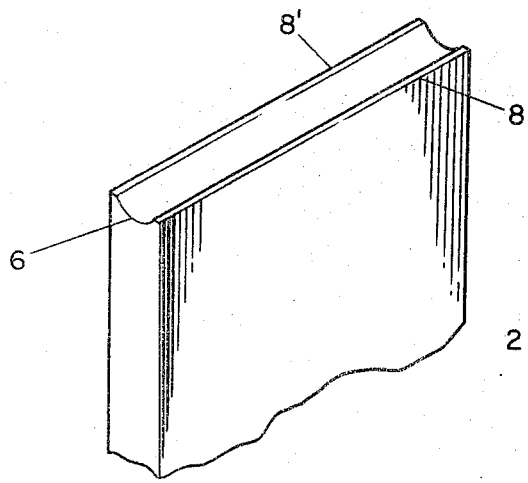
FIG. 2 is a three-dimensional detail view.
Figure 1:
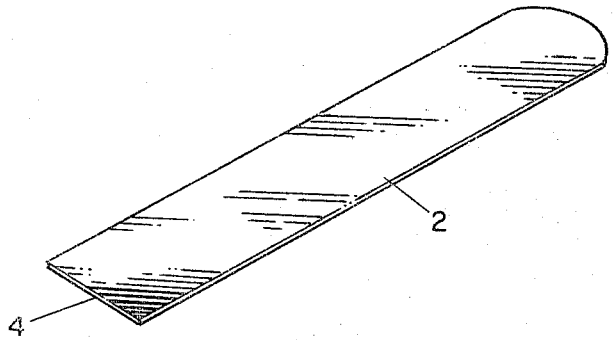
FIG. 1 is a three-dimensional illustration of the complete device.

The present device, as constructed according to the concept and ideas formulating the design of the invention disclosure, is illustrated in the accompanying drawings, and described as follows:

FIG. 1 shows the complete device (reference numeral 2) which may be formed from an aluminum alloy, stainless steel, glass or a durable plastic material, and of a length suitable for holding comfortably during use. The trough end (reference numeral 4) is shown in FIG. 2 in enlarged detail, and embodies the rounded concave trough (reference numeral 6) with it's adjacent flat edges (reference numerals 8 and 8'). the rounded concavity of this trough is essential, as it allows a micropipet or similar device to fit the trough with a minimum of clearance, in order to evenly deposit the sample, while the flat edges (8 and 8') adjacent to the trough prevent tearing or abrading of the electrophoresis paper under gentle pressure during the sample deposit.

Figure 3:
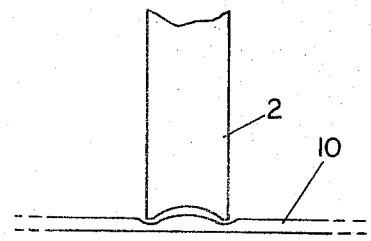
FIG. 3 is an orthographic end view of the device.

FIG. 3 illustrates the manner in which the applicator embosses the electrophoretic paper (reference numeral 10), in order to define the separation and to confine the serum sample.

Figure 4:
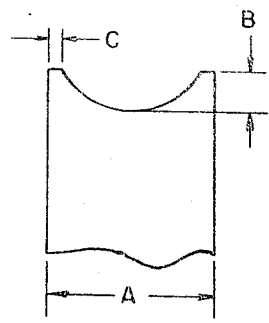
FIG. 4 is an orthographic dimensioned view of the trough end of the device.

FIG. 4 indicates the correct dimensions for a given applicator size — the trough applicators may be made in different sizes, but are restricted to special volumes — For an applicator with a volume capacity of from 4 to 8 microliters, dimension A in FIG. 4 is 2 millimeters, dimension B (depth of the trough) is 0.5 millimeters, and the width of the flat edges, dimension C, is 0.2 millimeters.

For an applicator with a sample volume capacity of from 1 to 4 microliters, dimension A is reduced to 1 millimeter, while the dimensions B and C remain the same.

Regardless of the material used to form the applicator, the surface texture of the trough must be of a matte or brushed finish, rather than polished, in order to maintain maximum adhesion of the fluid sample to the trough during transferral.

What is claimed for the present invention is:

1. A quantitative micro serum applicator device to apply a quantitative volume of serum quantitatively on electrophoresis paper comprising:

a thin, flat, generally rectangular handle member having a top end, a bottom end, opposed parallel side edges, and opposed parallel flat top and bottom surfaces;

the top end extending normal to the longitudinal axis of the handle completely between the opposite side edges thereof;

a trough extending longitudinally through the handle top end completely between the opposite side edges thereof, the ends of the trough opening out of the side edges, the trough being of a concave cross-sectional configuration when viewed along a plane normal to the handle and extending through the trough, the trough extending inwardly of the handle with its outermost edges disposed equal distance inwardly from the adjacentmost top and bottom surfaces of the handle; a pair of flat thin edges defined along the handle top end, the first edge extending between the handle top surface and the adjacentmost outermost edge of the trough, the second edge being of the same identical size and configuration as the first edge and extending between the handle bottom surface and the adjacentmost outermost edge of the trough;

the surfaces of each of the flat edges being highly polished and smooth;

the surface of the concave trough having a fine textured -matte like finish extending completely thereover to insure complete adherence of liquid serum samples thereto when placed thereon when the trough is placed in an inverted position;

whereby inversion of the handle to invert the trough to apply the serum on electrophoresis paper provides engagement of the flat edges with the paper which, under light pressure, effects a pair of spaced apart depressions along the paper with the paper material between the depressions being embossed upwardly to blot and absorb all of the serum sample and with the knife edges leaving a slight imprint on the paper after being so lifted to mark the placement of the sample thereon.

2. The applicator device as set forth in claim 1 wherein the handle is manufactured of a durable thermo-plastic material.

3. The applicator as set forth in claim 1 wherein the handle is manufactured of stainless steel material.

4. The applicator device as set forth in claim 1 wherein the handle is manufactured of an aluminum alloy.

5. The applicator device as set forth in claim 1 wherein the handle is manufactured of a glass material.

* * * * *